Figure 3:
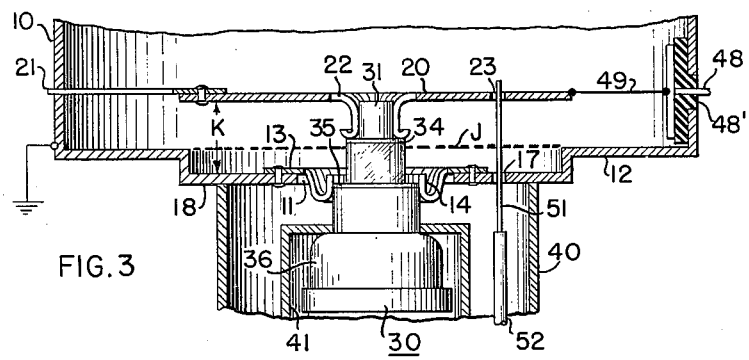

June 28, 1949.  H. A. WHEELER  2,474,608
ULTRA-SHORT-WAVE SIGNAL-TRANSLATING DEVICE
Filed Nov. 30, 1944  2 Sheets-Sheet 1
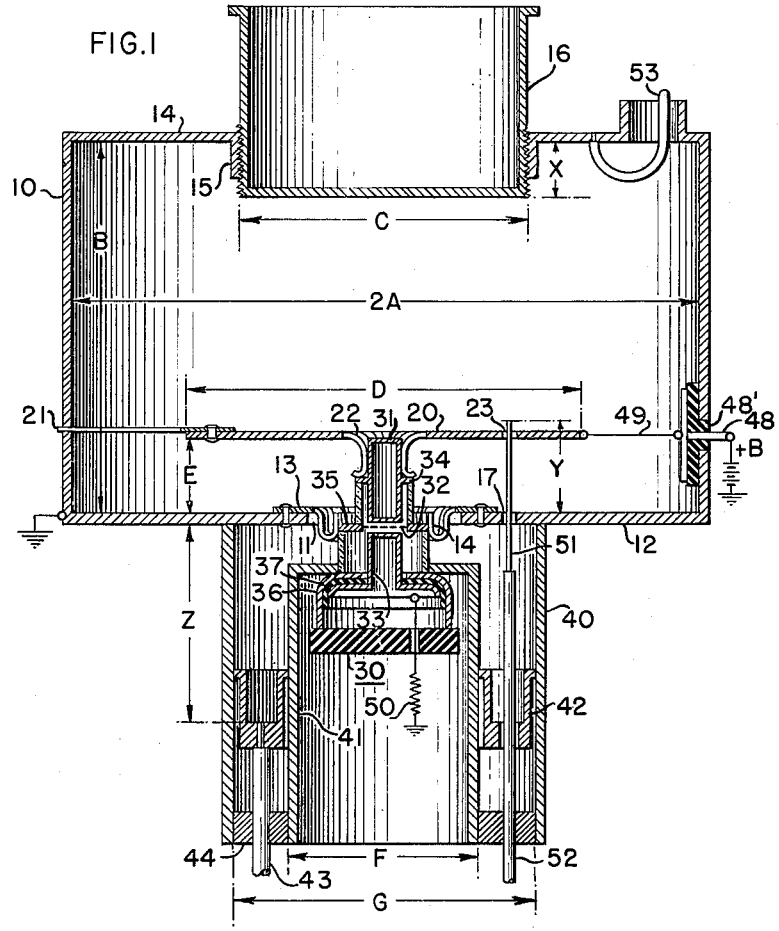
INVENTOR.
HAROLD A. WHEELER
BY Harry C. Page
ATTORNEY June 28, 1949.  H. A. WHEELER  2,474,608
ULTRA-SHORT-WAVE SIGNAL-TRANSLATING DEVICE
Filed Nov. 30, 1944  2 Sheets-Sheet 2

INVENTOR.
HAROLD A. WHEELER
BY Harry C. Page
ATTORNEY

Patented June 28, 1949

2,474,608

UNITED STATES PATENT OFFICE 2,474,608

ULTRA-SHORT-WAVE SIGNAL-
TRANSLATING DEVICE

Harold A. Wheeler, Great Neck, N. Y., assignor,
by mesne assignments, to Hazeltine Research,
Inc., Chicago, Ill., a corporation of Illinois Application November 30, 1944, Serial No. 565,828

3 Claims. (Cl. 315—39)

This invention relates, in general, to ultra-short-wave signal-translating devices and is particularly directed to such devices which embody a resonant cavity to determine an operating characteristic thereof. Although the invention is subject to a variety of applications, it is especially suited for use as an oscillation generator and will be described in that environment.

Resonant cavities exhibiting impedance characteristics analogous to those of a parallel-resonant circuit are known in the art. One such resonator has the form of a right-circular cylinder and it may be demonstrated that its resonant wave length at its fundamental mode of resonance bears a particular relation to the radius of the cavity and is independent of the cavity height. At this fundamental mode of resonance, the resulting electric field is a maximum along the axis of the cavity while the magnetic field is a maximum just inside its inner periphery.

An oscillation generator of the prior art utilizing a resonant cavity of the type mentioned above comprises a triode vacuum tube wholly enclosed within the cavity but spaced from the walls thereof. In establishing this mechanical assembly, the tube is supported by means of a conductive cathode disc which is likewise spaced from the cavity walls but secured thereto through suitable insulating supports. Circuit connections between the cavity and the tube are effected by leads connecting the anode and control electrodes to opposite end walls of the cavity and conductively connecting the cathode with the cathode disc.

Such prior-art oscillation generators have several inherent limitations which may be objectionable in particular installations. For example, with the vacuum tube and the cathode disc both wholly contained within the resonant cavity, the operating wave length at the fundamental mode of resonance is likely to be much different from the theoretical resonant wave length, computed with reference to the cavity radius. This shift in the operating wave length may be undesirable and results from distortion of the electric and magnetic fields within the cavity due to the presence of the tube and its supporting cathode plate. Also, the location of the tube within the cavity is inconvenient for making necessary tube replacements.

It is the object of the invention, therefore, to provide an ultra-short-wave signal-translating device employing a resonant cavity and which avoids one or more of the aforementioned limitations of prior arrangements.

It is another object of the invention to provide an improved ultra-short-wave signal-translating device employing a resonant cavity and having a simplified mechanical construction.

It is a specific object of the invention to provide an improved ultra-short-wave signal-translating device embodying a resonant cavity and having an operating wave length which closely approximates the theoretical resonant wave length of the cavity.

In accordance with the invention, an ultra-short-wave signal-translating device comprises a cavity resonator having an aperture in one wall thereof and having a particular fundamental mode of resonance. The device has conductive means disposed within the resonator in an equipotential plane for coupling an electron-discharge device thereto while preserving the fundamental mode of resonance and spaced from the aforesaid one wall by a substantial fraction of the distance to the opposite wall of the resonator. The signal-translating device also includes an electron-discharge device having spaced anode-electrode, cathode-electrode and control-electrode structures projecting through the apertures with a first one and a second one of the electrode structures connected respectively to the aforesaid one wall of the resonator and to the above-mentioned conductive means while the third one of the electrode structures is external to the resonator. The device further includes means external to the resonator coupling the first and the third electrode structures, and a short-wave choke projecting into the resonator, connected to the conductive means and disposed in the equipotential plane for applying an excitation potential to the electron-discharge device through the conductive means.

For a better understanding of the present invention, together with other and further objects thereof, reference is had to the following description taken in connection with the accompanying drawings, and its scope will be pointed out in the appended claims.

In the drawings, Fig. 1 is a cross-sectional view of an ultra-short-wave signal-translating device in accordance with the invention; Fig. 2 is a schematic diagram utilized in explaining the operation of the Fig. 1 arrangement, and Fig. 3 is a partial view of a modification of the Fig. 1 arrangement.

Referring now more particularly to Fig. 1 of the drawings, the invention is illustrated in connection with an ultra-short-wave signal-translating device, specifically, an oscillation generator adjustably tuned for operation over a desired range of ultra-short wave lengths. The oscillation generator comprises a conductive resonant cavity 10 having the form of a right-circular cylinder with a cylindrical vertical wall and planar end walls 12 and 14. An aperture 11 is centrally located in one wall 12 of the cavity. This wall also includes provisions for engaging an electrode structure of an electron-discharge device, serving mechanically to support the electron-discharge device and to effect electrical connections between a given electrode structure thereof and cavity 10. To this end a contact clip 13 is secured to wall 12, overlapping aperture 11. As illustrated, clip 13 has formed resilient contact fingers for yieldably engaging a particular electrode structure of an electron-discharge device. The opposite end wall 14 of the cavity carries a threaded bushing 15 which adjustably supports a cylindrical tuning plunger 16 of conductive material in coaxial alignment with the cavity for controlled movement into and out of the central portion of the cavity. Tuning plunger 16 constitutes means for adjusting the operating wave length of the cavity in well-known manner.

Within the described cavity there is supported a conductive means which is spaced from the cavity walls by a substantial fraction of the smallest internal dimension of the cavity. This means is a thin circular sheet or disc 20 of conductive material coaxially disposed within the cavity in parallel relationship with wall 12 and of such cross-sectional dimension as to be effectively disposed in an equi-potential plane. A series of supporting fingers 22 of insulating material is carried by disc 20 for projection through suitable apertures in the cylindrical wall of the cavity for mechanically securing the disc in its described relationship therein. Disc 20 likewise has provisions for engaging an electrode structure of an electron-discharge device to aid in supporting the device and to effect connections between a given electrode structure thereof and disc 20. As illustrated, the central portion of the disc is formed into resilient contact fingers 22, proportioned with reference to the particular electron-discharge device desired to be associated with the cavity assembly.

The signal-translating device includes an electron-discharge device or vacuum tube 30 having spaced anode-electrode and cathode-electrode structures and an intermediate control-electrode structure. Tube 30 has coaxially-aligned electrode elements including a rod-type anode electrode 31, a planar mesh control electrode 32 and a rod-type cathode electrode 33 arranged in the recited order and enclosed within an evacuated envelope. To facilitate making circuit connections with its electrode elements, tube 30 has an anode ring 34, a control-electrode ring 35 and a conductive shell 36 capacitively coupled to the cathode and spaced therefrom by a dielectric material 37. Also, conventional terminal prongs are provided but, for the sake of simplicity, they have been omitted from the drawings. Such terminal prongs are employed to connect a source of heater voltage to the tube. Tube 30 is so positioned with reference to aperture 11 of the cavity that a first one and a second one of its electrode structures connect, respectively, to the cavity wall 12 and conductive plate 20 while the third electrode structure falls external to the cavity. In particular, for the arrangement under consideration, the control electrode is engaged by contact clip 13 to be connected therethrough to cavity 10, the anode-electrode structure is received by contact fingers 22 to be connected thereby with conductive plate 20 and the cathode structure is completely external to the cavity.

The signal-translating device has means, also external to the cavity, for coupling that electrode structure of tube 30 which connects to cavity 10 and the electrode structure that is external to the cavity. In the instant embodiment these electrode structures are the control-electrode and cathode structures, respectively, and their coupling is accomplished through a second resonant cavity in the form of a coaxial, resonant transmission-line section. The transmission-line section is formed by an outer cylindrical conductor 40 which may constitute an extension integrally formed on wall 12 of the cavity and a coaxially-arranged inner conductor 41. Conductor 41 has a U-shaped cross-sectional configuration and the base thereof is suitably apertured and formed to engage cathode shell 36 electrically to connect this conductor and the cathode-electrode structure of tube 30. Transmission-line section 40, 41 is short-circuited by a conductive ring 42 positioned in the interconductor space and proportioned slidably to engage each conductor. A tuning control consisting of an insulated rod 43 projects through a closure ring 44 of the transmission-line section into engagement with short-circuiting ring 42. Through the agency of tuning control 43, ring 42 may be adjustably positioned to tune transmission-line section 40, 41.

A source of space current, indicated +B, is coupled to a terminal stud 48 which is spaced from the walls of cavity 10 by a dielectric bushing 48' to provide in conjunction therewith a by-pass condenser for isolating generated oscillations from the +B source. A short-wave choke, comprising a conductor 49, preferably having an electrical length of about one-quarter of the mean operating wave length of the generator couples the space current source to the anode of the tube 30, by way of disc 20. Conductor 49 is positioned in a substantially equi-potential plane so that the electric fields established within the cavity are not disturbed by the presence of the conductor. A cathode resistor 50, schematically represented as being connected between cathode 33 and ground, completes the direct current paths of the generator and provides a self-biasing potential. Resistor 50 may be conveniently connected with a cathode terminal prong of tube 30 (not shown in the drawings). The required feedback path from the resonant cavity, coupled to the anode and control-electrode structures of tube 30, to that associated with its cathode and control-electrode structures is supplied by an adjustable capacitive coupling between the anode and cathode electrodes. Since the inherent anode-cathode interelectrode capacitance of the tube is small, a conductive probe 51, projecting into close proximity with disc 20, is utilized to provide the desired feedback coupling. Probe 51 is carried by an insulating rod 52 which passes freely through ring 42 and frictionally engages closure ring 44 of transmission-line section 40, 41 so as to be readily adjustable. The probe extends through an additional aperture 17 in wall 12 of the cavity and an aligned aperture 23 of disc 20. An output signal is derived from the generator by means of an inductive probe 53 positioned in the cavity in a region of maximum magnetic flux density.

In considering the operation of the described oscillation generator, it will be seen that there are associated with vacuum tube 30 a pair of resonant cavities, individually exhibiting the impedance characteristics of a parallel-resonant circuit. The first such cavity 10 is coupled to the anode and control-electrode structures through a capacity-type voltage divider provided by conductive disc 20. The second resonant cavity is coupled to the cathode and control-electrode structures of the tube and comprises the short-circuited resonant transmission-line section, including conductors 40 and 41 and adjustable short-circuiting ring 42. To establish a desired operating wave length for the oscillation generator, tuning plunger 16 is adjusted so that the operating wave length of cavity 10 corresponds substantially to the desired value. Also, tuning ring 42 is positioned so that the effective electrical length of the cathode-control electrode cavity is approximately equal to one-quarter of the mean operating wave length. Having effected these adjustments, the circuit of the oscillation generator is equivalent to the schematic circuit diagram of Fig. 2.

The oscillation generator of Fig. 2 is represented as having lumped circuit constants. In this representation the distributed inductance and capacitance of the anode cavity 10 are indicated by inductor $L_1$ and condenser $C_1$, respectively. The capacitive voltage divider through which this cavity is coupled to the anode and control electrodes is indicated by serially connected condensers $C_2$ and $C_3$. Of these, condenser $C_2$ includes the interelectrode capacitance of the anode and control-electrode structures. Inductor $L_4$ and condenser $C_4$ designate the distributed inductance and capacitance, respectively, of the cathode-control electrode cavity 40, 41. The feedback path includes a condenser $C_5$, representing the interelectrode capacitance of the anode and cathode electrodes plus the additional coupling therebetween afforded by probe 51. Condenser $C_6$ designates the coupling between the cathode of tube 30 and its conductive shell 36. In order to obtain the phase relations required to support sustained oscillations, resonant circuit $L_1$, $C_1$ is usually tuned to represent an inductive reactance while the other resonant circuit $L_4$, $C_4$ is adjusted to constitute a capacitive reactance. The oscillator is then similar to the well-known Colpitts oscillator, the operation of which is well understood in the art.

The operating wave length of this oscillator may be varied over a selected range of ultra-short waves, determined largely by the permissible displacements of tuning controls 16 and 42 which simultaneously vary the inductive and capacitive reactances of the resonant cavities, as indicated by the unicontrols of Fig. 2. Since the displacements of the tuning controls are in the same sense to produce a desired shift in the operating wave length of the oscillator, they may be controlled together through a suitable mechanical linkage.

The spacing of conductive disc 20 with reference to cavity wall 12 is selected with a view to obtaining a compromise between efficiency and wave length stability. The efficiency increases directly with the spacing of disc 20 from cavity wall 12 while the wave length stability varies inversely with this spacing.

The described oscillator has several decided advantages over prior-art arrangements mentioned above. Notably, where the displacement $x$ of the cavity tuning plunger 16 is zero, the operating wave length very closely approaches the theoretical operating wave length of the cavity. In this connection, it may be demonstrated that the theoretical operating wave length of a right-circular cylindrical cavity excited for its fundamental mode of resonance is 2.61 times the radius of the cavity. The ratio of wave length to cavity diameter, in the same theoretical case, is equal to 1.305. In a practical embodiment of the invention, having the construction illustrated in Fig. 1, this ratio calculated from the oscillator performance was equal to 1.37. The significant specifications of this oscillation generator, which are only given for purposes of illustrating a specific design and not by way of a limitation on the scope of the invention, are recited in the following table. The dimensions correspond with those indicated in Fig. 1 and are expressed in terms of the operating wave length of the generator.

Resonant cavity 10:
    Dimension 2A _____ 0.728
    Dimension B _____ 0.364
    Dimension C _____ 0.258
    Dimension D _____ 0.374
    Dimension E _____ 0.0665
Resonant cavity 40, 41:
    Dimension F _____ 0.188
    Dimension G _____ 0.282
Tuning Adjustments:
    Dimension X _____ 0.000
    Dimension Y _____ 0.0775
    Dimension Z _____ 0.166
Tube 30 _____ type 446 (General Electric Company)
Anode-cathode excitation _____ 200 volts In the Fig. 1 embodiment only a small portion of tube 30 actually projects into resonant cavity 10. This is especially desirable since the introduction of the tube into the cavity, as indicated above, tends to distort the electric and magnetic fields and effect an undesirable shift in the operating wave length. While it is necessary to have at least a portion of one of the electrode structures extend into the cavity, the cavity may be modified to compensate for its effect. Such a modification is represented in the partial view of Fig. 3 which is generally similar to Fig. 1, corresponding portions thereof being identified by like reference characters. However, for convenience of illustration, only the outline of tube 30 is shown.

In Fig. 3, cavity wall 12 has a centrally-located recessed portion or well 18 accommodating aperture 11. The depth of well 18 is selected so that the spacing, indicated by dimension line K, from the well to conductive plate 20 causes the capacitance in this region of the resonant cavity to be decreased by an amount corresponding substantially to the increment of capacitance effectively contributed to the cavity by the presence of tube 30. In other words, the space relationship of conductive disc 20 with reference to well 18 is such that the capacitance between the disc and cavity wall 12 in the presence of tube 30 is substantially the same as the capacitance between the disc and wall 12 in the absence of the tube and assuming wall 12 to be continuous, as represented by broken-construction line J. One particular advantage to this modification of the invention is that tube 30 causes substantially no distortion of the fields within cavity 10. For this reason the operating wave length of the generator very closely approaches the theoretical resonant wave length of cavity 10. Additionally, choke 49, through which the source of space current is coupled to disc 20, may readily be maintained in an equipotential plane. Therefore, oscillations generated in the cavity are effectively isolated from the source of space current.

In the described oscillation generator arrangements there is an improved thermal conductivity from the anode-electrode structure of tube 30 to the conductive member disposed within cavity member 10 for radiating heat from the anode structure.

The control electrode - cathode circuits of the oscillation generators and the type feedback coupling employed are not limited to the disclosures of the drawings. However, the capacitive type feedback and the specific cathode circuit arrangement illustrated are particularly advantageous. Such arrangements facilitate adjustment of the feedback coupling and isolate undesirable effects of the tube 30 from its anode-control electrode circuit. It will be apparent that the described arrangements may, if desired, be utilized as amplifier or repeater circuits and are not to be restricted to use as oscillation generators. In converting the arrangements to amplifier circuits, the feedback probes 51 would ordinarily be removed to minimize capacitive coupling between the cathode input circuit and anode output circuit.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An ultra-short-wave signal-translating device comprising, a cavity resonator having an aperture in one wall thereof and having a particular fundamental mode of resonance, conductive means disposed within said resonator in an equipotential plane for coupling an electron-discharge device thereto while preserving said fundamental mode of resonance and spaced from said one wall by a substantial fraction of the distance to the opposite wall of said resonator, an electron-discharge device having spaced anode-electrode, cathode-electrode and control-electrode structures and projecting through said aperture with a first one and a second one of said electrode structures connected respectively to said one wall of said resonator and to said conductive means while the third one of said electrode structures is external to said resonator, means external to said resonator coupling said first and third electrode structures, and a short-wave choke projecting into said resonator, connected to said conductive means and disposed in said equipotential plane for applying an excitation potential to said electron-discharge device through said conductive means.

2. An ultra-short-wave signal-translating device comprising, a cavity resonator having an aperture in one wall thereof and having a particular fundamental mode of resonance, conductive means within said resonator for coupling an electron-discharge device thereto while preserving said fundamental mode of resonance and spaced from said one wall by a substantial fraction of the distance to the opposite wall of said resonator, an electron-discharge device having spaced anode-electrode, cathode-electrode and control-electrode structures and projecting through said aperture with a first one and a second one of said electrode structures connected respectively to said one wall of said resonator and to said conductive means while the third one of said electrode structures is external to said resonator, means external to said resonator coupling said first and third electrode structures, and a conductive probe insulated from but projecting through said resonator into close proximity with said conductive means and coupling said second and third electrode structures.

3. An ultra-short-wave signal-translating device comprising: a cavity resonator having an aperture in one wall thereof and having a particular fundamental mode of resonance; conductive means within said resonator for coupling an electron-discharge device thereto while preserving said fundamental mode of resonance and having a spacing from said one wall of the order of one-fifth of the distance to the opposite wall of said cavity; an electron-discharge device having spaced anode-electrode, cathode-electrode and control-electrode structures and projecting through said aperture with a first one and a second one of said electrode structures connected respectively to said one wall of said resonator and to said conductive means while the third one of said electrode structures is external to said resonator; and means external to said resonator coupling said first and third electrode structures.

HAROLD A. WHEELER.

REFERENCES CITED

The following references are of record in the file of this patent:

UNITED STATES PATENTS

| Number | Name | Date |
| --- | --- | --- |
| 2,157,952 | Dallenbach | May 9, 1939 |
| 2,353,743 | McArthur | July 18, 1944 |
| 2,408,355 | Turner | Sept. 24, 1946 |
| 2,416,565 | Beggs | Feb. 25, 1947 |